US011120423B2

(12) United States Patent
Vijayaraghavan et al.

(10) Patent No.: US 11,120,423 B2
(45) Date of Patent: Sep. 14, 2021

(54) SECURE DATA SUBMISSION VIA AUDIO TRANSMISSION

(71) Applicant: Amazon Technologies, inc., Seattle, WA (US)

(72) Inventors: Aravindhan Vijayaraghavan, Redmond, WA (US); Jacob Daniel Robert Harding, Seattle, WA (US); Varun Sharma, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 16/356,853

(22) Filed: Mar. 18, 2019

(65) Prior Publication Data
US 2020/0302423 A1  Sep. 24, 2020

(51) Int. Cl.
*G06Q 40/00* (2012.01)
*G06Q 20/32* (2012.01)
(Continued)

(52) U.S. Cl.
CPC ............ *G06Q 20/325* (2013.01); *G10L 13/00* (2013.01); *G10L 15/22* (2013.01); *H04L 63/0861* (2013.01)

(58) Field of Classification Search
CPC .................................................. G06Q 20/382
(Continued)

(56) References Cited

U.S. PATENT DOCUMENTS

| 10,089,983 | B1 | 10/2018 | Gella et al. | |
| 10,143,027 | B1* | 11/2018 | Singh | H04W 76/14 |
| 10,325,596 | B1* | 6/2019 | Tran | H04L 12/2809 |
| 2004/0243496 | A1* | 12/2004 | Kim | G06Q 20/3674 |
| | | | | 705/35 |
| 2006/0252457 | A1* | 11/2006 | Schrager | H04M 1/6066 |
| | | | | 455/556.1 |
| 2008/0152107 | A1* | 6/2008 | Mendiola | G06Q 40/00 |
| | | | | 379/114.01 |

(Continued)

FOREIGN PATENT DOCUMENTS

JP  6454807 B1  1/2019

OTHER PUBLICATIONS

An advanced integrated architecture for wireless voicemail data retrieval; Proceedings 15th International Conference on Information Networking (pp. 403-410); K. Koumpis, C. Ladas, S. Renals, Jan. 1, 2001. (Year: 2001).*

(Continued)

*Primary Examiner* — Tien C Nguyen
(74) *Attorney, Agent, or Firm* — Kilpatrick Townsend & Stockton LLP

(57) ABSTRACT

Techniques for managing communications sessions between multiple user devices is provided. The computer system may support a capability of automatically establishing communications sessions between the user devices. For example, the computer system may receive audio data from a voice controlled device (VCD). The audio data may indicate an utterance of a user confirming that information of a payment instrument is needed for transaction. The computer system may initiate a second communications session with a second device of the user to receive the information required for the transaction. In some examples, the computer system may execute the script to synthesize text-to-speech content that requests user input for the information from the second device. Once received, the information may be stored in a user account associated with the user. The VCD may be instructed to resume communications with the user upon termination of the second communications session with the second device.

20 Claims, 8 Drawing Sheets

(51) Int. Cl.
  *G10L 13/00*    (2006.01)
  *G10L 15/22*    (2006.01)
  *H04L 29/06*    (2006.01)

(58) Field of Classification Search
  USPC .......................................................... 705/41
  See application file for complete search history.

(56) References Cited

U.S. PATENT DOCUMENTS

2010/0279658 A1* 11/2010 Singh .................... H04M 1/645
                                                    455/412.1
2012/0245944 A1*  9/2012 Gruber .................. G06F 40/279
                                                    704/270.1
2015/0127538 A1*  5/2015 Tew ................. G06Q 20/40145
                                                    705/44
2018/0090149 A1   3/2018 Yamada

OTHER PUBLICATIONS

PCT/US2020/019708, Jun. 12, 2020, International Search Report and Written Opinion, 12 pages.

* cited by examiner

US 11,120,423 B2

SECURE DATA SUBMISSION VIA AUDIO TRANSMISSION

BACKGROUND

Secure transmissions and ease of use are often considered with system development. For example, the system may require secure data transmissions and implement roadblocks to ensure that the data is transmitted securely. However, these roadblocks may hinder the ease of use of the system. Thus, there is a need for better authentication and authorization with data transmissions, while still ensuring ease-of-use of the system. Embodiments of the disclosure address and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
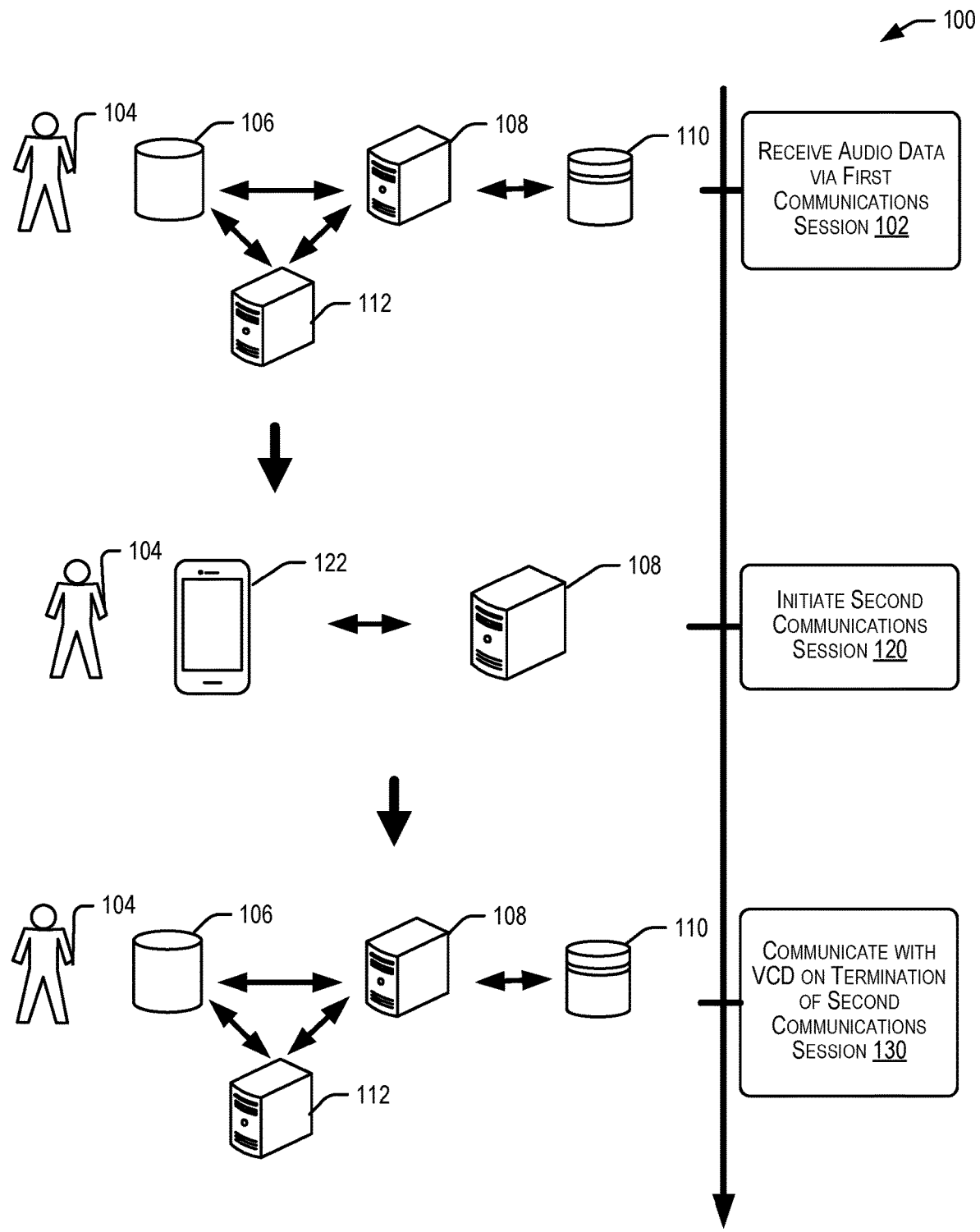
FIG. 1 illustrates an illustrative flow for providing a language processing system described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for managing communications sessions between multiple user devices. The computer system may support a capability of automatically establishing communications sessions between the user devices. For example, the computer system may receive audio data from a voice controlled device (VCD). The audio data may indicate an utterance of a user confirming that information of a payment instrument is needed for transaction. The computer system may initiate a second communications session with a second device of the user to receive the information required for the transaction. In some examples, the computer system may execute the script to synthesize text-to-speech (TTS) content that requests user input for the information from the second device. Once received, the information may be stored in a user account associated with the user. The computer system may instruct the VCD to communicate with the user upon termination of the second communications session with the second device. For example, the first communication session may be restarted or, alternatively, a new communications session with the VCD may be started.

In some examples, the computer system may receive or store a plurality of identifiers associated with the communications sessions. These identifiers may include an identifier of the communications session, an identifier of the user, an identifier of the transaction, and/or an identifier of a mobile device of the user associated with the audio data. In some examples, the identifiers may be maintained by the computer system to help track communications sessions that are idle, paused, or terminated so that these communications sessions may be restarted at a later time. In some examples, the later time may correspond with a time range past a predetermined timeout range where the user device may timeout when user input is not received.

In an illustrative example, a user may receive a new voice controlled device (VCD) and set up a user account associated with the VCD. The user may recite a request to play a song by the VCD (e.g., "speaker, play The Acme Song"). The VCD may transmit a request to play the song to a computer system and a computer system may offer the user unlimited music play for three dollars per month. The VCD may execute a script that synthesizes text-to-speech (TTS) content from the computer system that asks the user if they would like to move forward with the purchase. The user may utter a confirmation of the purchase. The computer system may access a user account that stores a payment instrument to complete the purchase. The computer system may attempt to charge the payment instrument associated with the user account, but may identify that the payment instrument is expired, missing, or otherwise unavailable to complete the purchase and needed for the transaction. The computer system may pause the first communications session and initiate a second communications session with a second device of the user. This second communications session may be initiated to receive user input about the information of the payment instrument from the device. In some examples, the computer system may execute and transmit a script that synthesizes TTS content that requests user input about the payment instrument. The user may type in the information of the payment instrument at the device and transmit the information via the second communications session. The computer system may store the information in the user account and/or use the information to initiate the transaction for the unlimited music play for three dollars per month. Upon receiving the information, the computer system may terminate the second communications session with the device and restart the first communications session with the VCD.

Numerous technical benefits are realized in embodiments of the application. For example, the computer system may collect information audibly via the VCD as well as collect information in a non-audible format. The computer system may receive sensitive payment information using a digital or analog touchpad, for example, of a mobile device via the second communications session so that the payment information may not be overheard by other entities within a proximate distance of the VCD. This may also increase the comfort level of users to provide sensitive payment information and not require the users to speak aloud the information. This may also help ensure data security at the VCD in addition to any encrypted or otherwise secure data transmission lines.

In some examples, the first communications session between the VCD, the user, and the computer system may be terminated during the time that the information of the payment instrument is received. This may also correspond with a technical benefit, at least because the microphone associated with the VCD may not receive irrelevant audio recordings and improve the privacy of the user with respect to the VCD and received audio data. For example, the VCD may receive audio data only in response to receiving a keyword (e.g., "Alexa, play The Acme Song") and may turn off a microphone associated with the VCD when audio data is unnecessary to further the transaction requested by the user. In some examples, the audio data may be restarted and received in response to a triggering event, including the termination of the second communications session between the second device and the computer system. This may improve and minimize the amount of audio data received. For example, the audio data may be associated with the triggering event rather than restarting the receipt audio data after a predetermined amount of time (e.g., prior to receiving the payment information from the second device). This may limit the amount of unnecessary data collected and stored by the system as well as improve the privacy of users of the system.

FIG. 1 illustrates an illustrative flow for providing an authentication system described herein, according to at least one example. The process 100 can begin with receiving audio data via the first communications session at 102. For example, a user 104 can interact with a voice controlled device (VCD) 106 to perform an action or utter a confirmation of a request to initiate a transaction. As an illustrative example, a user may recite a request to play a song by the VCD 106 (e.g., "speaker, play The Acme Song"). The VCD 106 may transmit a request to play the song to a language processing system 108 and the language processing system 108 may offer the user unlimited music play for three dollars per month. The language processing system 108 may execute a script that synthesizes text-to-speech (TTS) content that asks the user if the user 104 would like to move forward with the purchase. The user 104 may speak "yes" or otherwise utter a confirmation of the purchase and transmit the confirmation to the language processing system 108.

The language processing system 108 may receive the audio data from the VCD 106 and store the information in a data store 110 (e.g., associated with a user account, etc.). The information may include a first identifier of the first communications session, a second identifier of the user 104, and/or a third identifier of the transaction. In some examples, the language processing system 108 may determine additional information from the data store 110, including a fourth identifier of a mobile device associated with the user 104. In some examples, the fourth identifier may be determined based at least in part on matching the second identifier of the user with user account information stored in the data store 110. Other types of information may be stored with the data store 110 without diverting from the scope of the disclosure.

In some examples, the user account information may correspond with a digital wallet system 112 for initiating transactions. The second identifier of the user 104 may be stored with the digital wallet 112 and submitted as part of a payment transaction to order goods or services from a merchant at a later time.

The language processing system 108 may identify that information of the payment instrument is missing, incomplete, or expired in the user account or in the digital wallet system 112. This may include, for example, a missing credit or debit account number, card verification value (CVV), expiration date, or other information about a payment instrument. The language processing system 108 may initiate a request to receive user input about the information of the payment instrument in order to initiate the transaction.

In some examples, the language processing system 108 may identify that information of the device is missing or incomplete. This may include a phone number associated with a mobile phone used to initiate a communications session between the language processing system 108 and the device of the user. In some examples, the phone number may be customarily stored with a user account and identification of the missing or incomplete information may be identified by accessing the user account to determine the missing or incomplete information for the phone number.

In some examples, the first communications session may be paused or terminated prior to starting a second communications session. In some examples, the first communications session may remain active and timeout (e.g., stop receiving audio data via a microphone at the VCD) after a threshold amount of time. Upon exceeding the timeout threshold, the microphone of the first communication session may be paused or terminated.

The process 100 may also initiate a second communications session at 120. The second communications session may be initiated between the language processing system 108 and the mobile device 122 of the user 104. The mobile device 122 may correspond with the fourth identifier (e.g., phone number, unique serial number of the mobile device, etc.) and, in some examples, may be stored with the user account. In some examples, the language processing system 108 may execute a script that synthesizes text to speech (TTS) content. The TTS content may request user input about the information of the payment instrument associated with the user account or device involved with the transaction (e.g., phone number, etc.). The language processing system 108 may transmit, with the second communications session, the TTS content to the mobile device 122 for presentation at the mobile device 122. The TTS content may identify the transaction, the item, or other information that may be relevant.

The mobile device 122 may request user input about the information of the payment instrument using the TTS content. This may include, for example, initiating a telephone call between the mobile device 122 and the language processing system 108 and transmitting an audible prompt (e.g., the TTS content) to request the user input (e.g., "please provide your credit card account number and expiration date"). In some examples, the mobile device 122 may display a prompt to request the user input at a screen of the mobile device 122. In either example, did TTS content may identify the initiated transaction, previous interactions with the VCD, the item associated with the transaction, or other relevant information. The user may provide the user input by interacting with the mobile device 122 audibly or through tactile interactions with the screen of the mobile device 122.

The language processing system 108 may receive the user input about the information of the payment instrument from the mobile device 122 via the second communications session. The language processing system 108 may store the user input and/or any corresponding information in the user account of the user 104.

The process 100 may also resume communications with the VCD 106 at 130. For example, the first communications session may be restarted by matching the first identifier of the first communications session with stored information about the first communications session. In some examples, the first communications session may be restarted on a termination of the second communications session between the mobile device 122 and the language processing system 108. In some examples, a new third communications session may be established between the VCD 106 and the language processing system 108 without restarting the first communications session. The VCD 106 may be instructed to start a communications session with the user by the language processing system 108 absent receiving a keyword or wakeword from the user.

In some examples, the user 104 may provide a confirmation to communicate over the second communications session and/or restart the first communications session without a keyword that initiates the first communications session. In some examples, the user may confirm to communicate with the VCD 106 and/or the mobile device 122 (e.g., prior to the initiation of the first or second communications sessions) and the confirmation may be stored with the user account of the language processing system 108.

In some examples, the language processing system 108 may request a confirmation to restart the first communications session associated with the first identifier prior to restarting the first communications session. This confirmation may be transmitted and received in a third communications session with the device. In some examples, the request to confirm the restarting of the first communications session may be presented to the mobile device 122 and/or provided prior to interacting via the first or second communications sessions (e.g., stored with the user account profile for the user). In some examples, the first communications session is not restarted, but rather a new, third communications session is established upon the termination of the second communications sessions.

Figure 2:
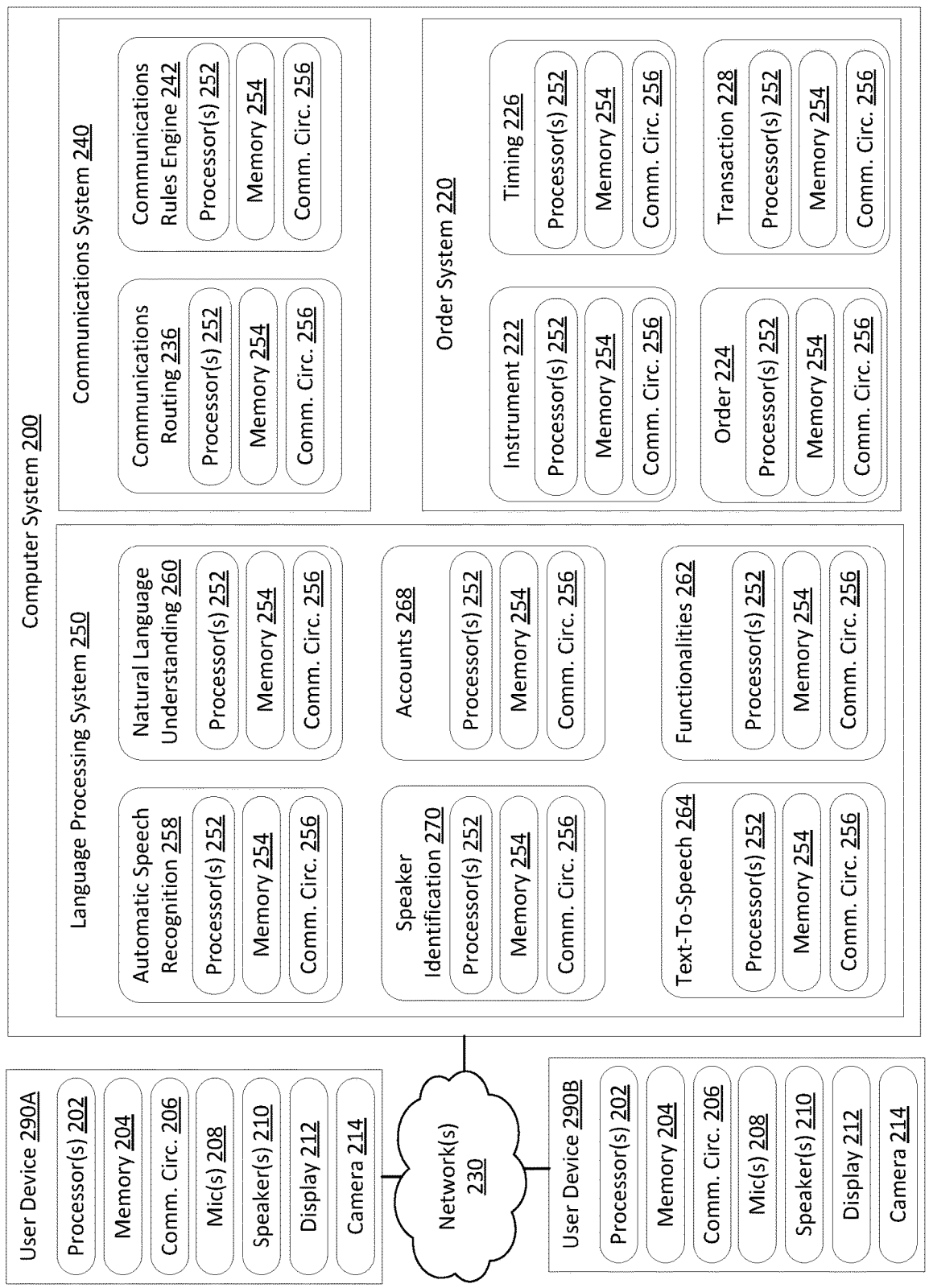
FIG. 2 illustrates an example computer system with a language processing system, communications system, transaction processing system, and one or more voice controlled devices, according to at least one example.

FIG. 2 illustrates an example system architecture of one type of user device, in accordance with various embodiments. As illustrated, a user device 290 may be configured to communicate with a computer system 200, and in particular with a language processing system 250, in response to detecting an utterance including a wakeword, which may subsequently be followed by a request/question/statement. Similarly, the user device 290 may alternatively or additionally include one or more manually activated components for manually activated capabilities. In this particular scenario, the user device 290 may also be configured, in some embodiments, to communicate with the language processing system 250, in response to a manual input being detected by one or more input mechanisms, such as a touch screen, a button, and/or a switch, for example. The user device 290 is usable to initiate and receive communications via a first communications session and restart communications upon termination of a second communications session (e.g., with or without including the wakeword).

In non-limiting embodiments, the user device 290 may be capable of being activated in response to detecting a specific sound, such as a wakeword. After detecting a specific sound (e.g., a wakeword or trigger expression), the user device 290 may recognize commands (e.g., audible commands, inputs) within captured audio, and may perform one or more actions in response to the received commands. Furthermore, the user device 290 may also be configured to perform one or more actions in response to detecting a particular touch, or mechanical, input(s) via the user device 290.

In non-limiting embodiments, the user device 290 may also be capable of being activated in response to detecting a termination of a second communications session or receiving an identification of the termination of the second communications session. In some examples, the second communications session may include communications between a second user device and the computer system 200.

The user device 290 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices, personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, the user device 290 may be relatively simple or basic in structure such that no, or a minimal number of, mechanical input option(s) (e.g., keyboard, mouse, track pad) or touch input(s) (e.g., touch screen, buttons) are included. For example, the user device 290 may be able to receive and output audio, and may include power, processing capabilities, storage/memory capabilities, and communication capabilities. However, in other embodiments, the user device 290 may include one or more components for receiving mechanical inputs or touch inputs, such as a touch screen and/or one or more buttons.

The user device 290, in some embodiments, may include a minimal number of input mechanisms (e.g., a power on/off switch) such that functionality of the user device 290 may solely or primarily be through audio input and audio output. For example, the user device 290 may include, or be in communication with, one or more microphones that listen for a wakeword by continually monitoring local audio. In response to the wakeword being detected, the user device 290 may establish a connection with the language processing system 250 (such as through a network(s) 230), send audio data to the language processing system 250, and await/receive a response from the language processing system 250. In some embodiments, however, non-voice/sound activated devices may also communicate with the language processing system 250 (e.g., push-to-talk devices). For example, in response to a button or touch screen being pressed, or a button or touch screen being pressed and held, a microphone associated with the user device 290 may begin recording local audio, establish a connection with the language processing system 250, send audio data representing the captured audio to the language processing system 250, and await/receive a response, and/or action to be occur, from the language processing system 250.

It may be recognized that although in the illustrative embodiment shown in FIG. 2, the computer system 200 includes the language processing system 250, this is merely exemplary, and the language processing system 250 may be separate from the computer system 200. For example, the language processing system 250 may be located within a dedicated computing device (such as one or more separate server(s), or within the user device 290) or computing system, which may or may not be in communication with the computer system 200 and/or one or more additional devices.

The user device 290 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within the user device 290, and/or one or more components may be omitted. For example, the user device 290 may also include a power supply or a bus connector. As still yet another example, the user device 290 may include one or more additional input and/or output mechanisms, such as one or more buttons, or one or more switches or knobs. Furthermore, while the user device 290 may include multiple instances of one or more components, for simplicity only one of each component has been shown.

In some embodiments, the user device 290 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, the user device 290 may be in communication with an additional processing device including one or more of: processor(s) 202, storage/memory 204, communications circuitry 206, microphone(s) 208, speaker(s) 210, display screen 212, and/or camera(s) 214. For example, a centralized control device of the user device 290 may include one or more microphone(s) 208. These microphone(s) 208 may receive audio input signals, which in turn may be sent to the language processing system 250 in response to a wakeword engine of the user device 290 determining that a wakeword was uttered.

The processor(s) 202 may include any suitable processing circuitry capable of controlling operations and functionality of the user device 290, as well as facilitating communications between various components within the user device 290. In some embodiments, the processor(s) 202 may include a central processing unit ("CPU"), a graphic processing unit ("GPU"), one or more microprocessors, a digital signal processor, or any other type of processor, or any combination thereof. In some embodiments, the functionality of the processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) 202 may include its own local memory, which may store program systems, program data, and/or one or more operating systems. However, the processor(s) 202 may run an operating system ("OS") for the user device 290, and/or one or more firmware applications, media applications, and/or applications resident thereon. In some embodiments, the processor(s) 202 may run a local client script for reading and rendering content received from one or more websites. For example, the processor(s) 202 may run a local JavaScript client for rendering HTML or XHTML content received from a particular URL accessed by the user device 290.

The storage/memory 204 may include one or more types of storage mediums such as any volatile or non-volatile memory, or any removable or non-removable memory implemented in any suitable manner to store data for the user device 290. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory 204 may be implemented as computer-readable storage media ("CRSM"), which may be any available physical media accessible by processor(s) 202 to execute one or more instructions stored within the storage/memory 204. In some embodiments, one or more applications (e.g., gaming, music, video, calendars, lists, etc.) may be run by the processor(s) 202, and may be stored in the memory 204.

In some embodiments, the storage/memory 204 may include a media system, which may be configured to facilitate communications between the user device 290 and the computer system 200. For example, the media system may store one or more communications protocols that may be executed by the processor(s) 202 for facilitating communications for the user device 290. In some embodiments, a sessions initiation protocol ("SIP") may be used to facilitate media transfer between the user device 290 and one or more of the computer system and a second user device 290. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the user device 290. In some embodiments, a Web Real-Time Communications ("WebRTC") protocols may be employed by the user device 290. In a non-limiting embodiment, the media system may include instructions that indicate which communications protocols to employ for facilitating media transfer between devices based on a device type of the user device 290. For example, if the user device 290 does not include the display 212 and/or camera 214, the media system may indicate that PJSIP should be used, whereas if the user device 290 includes the display 212 and/or camera 214, the media system may indicate that WebRTC protocols should be used.

In some embodiments, the storage/memory 204 may include one or more systems and/or databases, such as a speech recognition system, a wakeword database, a sound profile database, and a wakeword detection system. The speech recognition system may, for example, include an automatic speech recognition ("ASR") component 258 that recognizes human speech in detected audio signals and converts the audio signals to text data. The speech recognition system may also include a natural language understanding ("NLU") component 260 that determines user intent based on the text data it receives from ASR. Also included within the speech recognition system may be a text-to-speech ("TTS") component 264 that is capable of converting text to speech to be outputted by the speaker(s) 210 in the user device 290, and/or a speech-to-text ("STT") component capable of converting received audio signals into text to be sent to the language processing system 250 for processing.

The wakeword database may be a database stored locally by the storage/memory 204 of the user device 290, and may include a list of a current wakewords for the user device 290, as well as one or more previously used, or alternative, wakewords for the voice activated user device 290. In some embodiments, an individual may set or program a wakeword for their user device 290. The wakeword may be programmed directly on the user device 290, or a wakeword or wakewords may be set by the individual via a local client application that is in communication with computer system 200 and/or language processing system 250. For example, an individual may use their mobile device having the speech-processing system application running thereon to set the wakeword. The specific wakeword may then be communicated from the mobile device to the language processing system 250, which in turn may send/notify the user device 290 of the individual's selection for the wakeword. The selected activation may then be stored in the wakeword database of the storage/memory 204. In some embodiments, additional trigger expressions or permutations of the wakeword may also be stored within the storage/memory 204. For example, specific trigger expressions or words that indicate the presence of the wakeword may also be stored within the storage/memory 204. In some embodiments, audio watermarks, indicating a specific action or message, may also be stored within the storage/memory 204.

In some embodiments, sound profiles for different words, phrases, commands, or audio compositions are also capable of being stored within the storage/memory 204, such as within a sound profile database. For example, a sound profile of audio may be stored within the sound profile database of the storage/memory 204 on the user device 290. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by the microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by the microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the user device 290 may then begin transmitting the audio signal to the language processing system 250 for detecting and responds to subsequent utterances made by an individual.

In some embodiments, the storage/memory 204 may store voice biometric data associated with one or more individuals. For example, an individual that operates the user device 290 may have a registered user account on the computer system 200 (e.g., within accounts system 268). In some embodiments, the user device 290 may be associated with a group account, and various individuals may have user accounts that are operating under the rules and configurations of the group account. As an illustrative example, user device 290 may be associated with a first group account on the computer system 200, the first group account being for a family that lives at a household where first shared electronic device is located. Each family member may also have a user account that is linked to the first group account (e.g., a parent, a child, etc.), and therefore each user account may obtain some or all of the rights of the first group account. For example, the user device 290 may have a first group account on the computer system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

The user account may also correspond with one or more payment instruments. For example, a single payment instrument may correspond with a group account on the computer system 200 registered to a particular family or group, or in some examples, each of the users of the group may correspond with their own payment instrument. The "voice print" or "voice model" of the particular individual may correspond with the generic payment instrument for the group or may correspond with the payment instrument for the individual. In some examples, the user may select the payment instrument in response to an executed script generated by the text to speech module 264 and provided via the speaker 210 at the first user device 290A.

Upon receiving audio data representing an utterance, a voice print of that audio data may be generated using speaker identification functionality stored within the storage/memory 204. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow user device 290 to attempt and identify a speaker of a particular utterance locally. However, persons of ordinary skill in the art will recognize that the user device 290 may not perform speaker identification processing, and alternatively speaker identification processing may be performed by the computer system 200 (e.g., a speaker identification system 270), or no speaker identification processing may be performed altogether.

The communications circuitry 206 may include any circuitry allowing or enabling one or more components of the user device 290 to communicate with one another, or with one or more additional devices, servers, and/or systems. For example, the communications circuitry 206 may facilitate communications between the user device 290 and the computer system 200. As an illustrative example, audio data representing an utterance may be transmitted over the network(s) 230, such as the Internet, to the computer system 200 using any number of communications protocols. For example, the network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the user device 290 and the computer system 200. In some embodiments, the user device 290 and computer system 200 and/or one or more additional devices or systems (e.g., the language processing system 250) may communicate with one another via a web browser using HTTP. Various additional communication protocols may be used to facilitate communications between the user device 290 and computer system 200, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 3GSM, DECT, IS-136/TDMA, iDen, LTE, or any other suitable cellular network protocol), infrared, BitTorrent, FTP, RTP, RTSP, SSH, and/or VOIP.

The communications circuitry 206 may use any communications protocol, such as any of the previously mentioned exemplary communications protocols. In some embodiments, the user device 290 may include an antenna to facilitate wireless communications with a network using various wireless technologies (e.g., Wi-Fi, Bluetooth, radiofrequency, etc.). In yet another embodiment, the user device 290 may include one or more universal serial bus ("USB") ports, one or more Ethernet or broadband ports, and/or any other type of hardwire access port so that the communications circuitry 206 allows the user device 290 to communicate with one or more communications networks.

The user device 290 may also include one or more microphones 208 and/or transducers. Furthermore, one or more microphones located within a separate device may be in communication with the user device 290 to capture audio data for the user device 290. The microphone(s) 208 may be any suitable component capable of detecting audio signals. For example, the microphone(s) 208 may include one or more sensors for generating electrical signals and circuitry capable of processing the generated electrical signals. In some embodiments, the microphone(s) 208 may include multiple microphones capable of detecting various frequency levels. As an illustrative example, the user device 290 may include multiple microphones (e.g., four, seven, ten, etc.) placed at various positions about the user device 290 to monitor/capture any audio outputted in the environment where the user device 290 is located. The various microphones 208 may include some microphones optimized for distant sounds, while some microphones may be optimized for sounds occurring within a close range of the user device 290. In some embodiments, the microphone(s) 208 may only begin to detect audio signals in response to detecting the wakeword, receiving a notification of a termination of a second communications session, or a manual input to user device 290. For example, a manually activated device may begin to capture audio data using the microphone(s) 208 in response to a user input, such as pressing a button, tapping a touch screen, or providing any touch input gesture to a touch input component.

The user device 290 may include one or more speakers 210. Furthermore, the user device 290 may be in communication with one or more speaker(s) 210. The speaker(s) 210 may correspond to any suitable mechanism for outputting audio signals. For example, the speaker(s) 210 may include one or more speaker units, speaker housings, transducers, arrays of speakers, and/or arrays of transducers that may be capable of broadcasting audio signals and or audio content to a surrounding area where user device 290 may be located. In some embodiments, the speaker(s) 210 may include headphones or ear buds, which may be wirelessly wired, or hard-wired, to the user device 290, that may be capable of broadcasting audio directly to an individual.

In some embodiments, the one or more microphones 208 may serve as input devices to receive audio inputs. The user device 290, in the previously mentioned embodiment, may then also include the one or more speakers 210 to output audible responses. In this manner, the user device 290 may function solely through speech or audio, without the need for any input mechanisms or displays, however this is merely exemplary.

The display screen 212 may correspond to a display device and/or touch screen, which may be any size and/or shape and may be located at any portion of the user device 290. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen 212 may correspond to a projected capacitive touch ("PCT"), screen include one or more row traces and/or driving line traces, as well as one or more column traces and/or sensing lines. In some embodiments, the display screen 212 may be an optional component for the user device 290. For instance, the user device 290 may not include the display screen 212. Such devices, sometimes referred to as "headless" devices, may output audio, or may be in communication with a display device for outputting viewable content.

The display screen 212, in one non-limiting embodiment, may include an insulator portion, such as glass, coated with a transparent conductor, such as indium tin oxide ("InSnO"

or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen 212, a capacitance between the object and the conductive material may be formed. The processor(s) 202 may be capable of determining a location of the touch screen associated with where the capacitance change is detected, and may register a touch input as occurring at that location.

In some embodiments, the display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. The processor(s) 202 of the user device 290 may be configured to determine which pixels are associated with a particular location point, and which item or items are also displayed at that pixel location. Furthermore, the user device 290 may be configured to cause one or more additional actions to occur to the item or items being displayed on the display screen 212 based on a temporal duration the touch input, and or if one or more additional touch inputs are detected. For example, an object that contacted display screen 212 at a first location may be determined, at a later point in time, to contact the display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having one hundred driving lines and one hundred sensing lines may have one hundred intersection points, and therefore one hundred individual capacitors, while a touch screen display screen 212 having ten driving lines and ten sensing lines may only have ten intersection points, and therefore ten individual capacitors. Therefore, a resolution of the touch screen having one hundred intersection points may be greater than a resolution of the touch screen having ten intersection points. In other words, the touch screen having one hundred intersection points may be able to resolve a location of an object touching the touch screen with greater precision than the touch screen having ten intersection points. However, because the driving lines and sensing lines require a voltage to be applied to them, this may also mean that there is a greater amount of power drawn by the user device 290, and therefore the fewer driving lines and/or sensing lines used, the lesser the amount of power that is needed to operate the touch screen display.

In some embodiments, the display screen 212 may correspond to a high-definition ("HD") display. For example, the display screen 212 may display images and/or videos of 720p, 1080p, 1080i, or any other image resolution. In these particular scenarios, the display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 3,073,600 pixels. However, persons of ordinary skill in the art will recognize that the aforementioned display ratios and pixel numbers are merely exemplary, and any suitable display resolution or pixel number may be employed for the display screen 212, such as non-HD displays, 4K displays, and/or ultra-displays.

In some embodiments, the user device 290 may include one or more cameras 214, corresponding to any suitable image capturing component or components capable of capturing one or more images and/or videos. The camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, the user device 290 may include multiple the cameras 214, such as one or more front-facing cameras and/or one or more rear facing cameras. Furthermore, the camera(s) 214 may be configured to recognize far-field imagery (e.g., objects located at a large distance away from the user device 290) or near-filed imagery (e.g., objected located at a relatively small distance from the user device 290). In some embodiments, the camera(s) may be high-definition ("HD") cameras, capable of obtaining images and/or videos at a substantially large resolution (e.g., 726p, 1080p, 1080i, etc.). In some embodiments, the camera(s) 214 may be optional for the user device 290. For instance, the camera(s) 214 may be external to, and in communication with, the user device 290. For example, an external camera may be capable of capturing images and/or video, which may then be provided to the user device 290 for viewing and/or processing.

Persons of ordinary skill in the art will recognize that, in some embodiments, the display screen 212 and/or camera(s)

214 may be optional for the user device 290. For instance, the user device 290 may function using audio inputs and outputting audio, and therefore the display screen 212 and/or camera(s) 214 may not be included. Furthermore, in some embodiments, the user device 290 may not include the display screen 212 and/or camera(s) 214, but instead may be in communication with the display screen 212 and/or camera(s) 214. For example, the user device 290 may be connected to a display screen via a Wi-Fi (e.g., 802.11 protocol) connection such that visual content sent to the user device 290 may be sent to the display screen, and output thereby.

In some exemplary embodiments, the user device 290 may include an additional input/output ("I/O") interface. For example, the user device 290 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the user device 290 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the user device 290. For example, one or more LED lights may be included on the user device 290 such that, when the microphone(s) 208 receive audio, the one or more LED lights become illuminated, signifying that audio has been received by the user device 290. In some embodiments, one or more vibrating mechanisms or other haptic features may be included with the user device 290 to provide a haptic response to an individual.

In some embodiments, the user device 290 may include radio-frequency identification ("RFID") functionality and/or near field communication ("NFC") functionality. Furthermore, in some embodiments, the user device 290 may include one or more infrared ("IR") sensors and one or more IR emitters. The IR sensors/emitters may be used to determine depth information. For example, in one embodiment, a distance of an individual from the user device 290 may be determined using the one or more IR sensors/emitters. Depth determination may be performed using any depth determination technique. In some embodiments, a distance between an individual and the user device 290 may be employed as a basis for presenting content with varying density using the display screen 212. For example, when an individual is at a distance A from the user device 290, the user device 290 may display weather data for a current day. However as the user moves closer to the user device 290, such as at a distance B from the user device 290, which may be less than distance A, the user device 290 may display weather data for a current week. For instance, as the individual gets closer to the user device 290, the ability of the individual to see denser content increases, and as the individual moves father away from the user device 290, the individual's ability to see denser content decreases. This, for example, may ensure that the content displayed by the user device 290 is continually relevant and readable by the individual.

The computer system 200, in non-limiting, exemplary embodiments, may include the language processing system 250. However, in other embodiments, the language processing system 250 may be separate from, or in communication with, the computer system 200. Generally, the language processing system 250 may, in some embodiments, include one or more remote devices capable of receiving and sending content from/to one or more electronic device, such as the user device 290. The language processing system 250 may include various components and systems including, but not limited to, automatic speech recognition ("ASR") system 258, natural language understanding ("NLU") system 260, functionalities system 262, text-to-speech ("TTS") system 264, and accounts system 268. In some embodiments, language processing system 250 may also include computer readable media, including, but not limited to, flash memory, random access memory ("RAM"), and/or read-only memory ("ROM"). The language processing system 250 may also include various systems that store software, hardware, logic, instructions, and/or commands for the language processing system 250, such as a speaker identification ("ID") system 270, or any other system, or any combination thereof.

The ASR system 258 may be configured to recognize human speech in audio signals received from the user device 290, such as audio captured by the microphone(s) 208, which may then be transmitted to the language processing system 250. The ASR system 258 may include, in some embodiments, one or more processor(s) 252, storage/memory 254, and communications circuitry 256. The processor(s) 252, storage/memory 254, and communications circuitry 256 may, in some embodiments, be substantially similar to the processor(s) 202, storage/memory 204, and communications circuitry 206, which are described in greater detail above, and the aforementioned descriptions may apply. In some embodiments, the ASR system 258 may include speech-to-text ("STT") system 264. The STT system 264 may employ various speech-to-text techniques. However, techniques for transcribing speech into text are not described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 258 may include an expression detector that analyzes audio signals received by the language processing system 250, such as the expression detector mentioned above with regards to the user device 290. Such an expression detector may be implemented using keyword spotting technology, as an example. A keyword spotter is a functional component or algorithm that evaluates an audio signal to detect the presence of a predefined word or expression (e.g., a wakeword), such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

The NLU system 260 may be configured such that it determines user intent based on the text data is receives from the ASR system 258. For example, the NLU system 260 may determine that the intent of utterance is for initiating a communications session with a device, associated with a particular name (e.g., initiate a communications session with "Alice"). In response to determining the intent of the utterance, the NLU system 260 may communicate the received command to an appropriate subject matter server or skill on the functionalities system 262 to perform one or more tasks, and/or retrieve an appropriate response or response information. The NLU system 260 may include processor(s) 252, storage/memory 254, and communications circuitry 256 which, in one embodiment, may be substantially similar to the processor(s) 202, storage/memory 204, and communications circuitry 206 of the user device 290, and the previous description may apply.

The functionalities system 262 (also referred to as speechlets module 262) may, for example, correspond to various action specific systems or servers, sometimes referred to as "skills," capable of processing various task specific actions. The functionalities system 262 may further correspond to first party applications and/or third party applications capable of performing various tasks or actions. For example, based on the context of the audio data received from the user device 290, the language processing system 250 may use a certain functionality to generate a response, or to obtain response information, which in turn may be communicated back to the user device 290. For instance, an utterance may ask for weather information, and therefore the functionalities system 262 may access a weather application to obtain current weather information for a location associated with the user device 290. The functionalities system 262 may also include processor(s) 252, storage/memory 254, and communications circuitry 256.

The TTS system 264 may employ various text-to-speech (TTS) techniques. However, techniques for transcribing text into speech are not described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 264 may also include processor(s) 252, storage/memory 254, and communications circuitry 256.

The accounts system 268 may store one or more user accounts corresponding to users having a registered account on the computer system 200. For example, a parent may have a registered account on the computer system 200, and each of the parent's children may have their own user account registered under the parent's registered account. The accounts system 268 may also store one or more group accounts corresponding to one or more shared devices. For example, a shared device, such as a shared user device 290, may have its own group account stored on the accounts system 268. The group account may be associated with the shared device, and may also be linked to one or more individual's user accounts. For example, the shared user device 290 may be associated with a first group account corresponding to a first grouping of individuals (e.g., a family). One or more user accounts may also be associated with the first group account (e.g., individual members of the family), corresponding to individuals that may be capable of interacting with the shared user device 290. Information, permissions, settings, and/or preferences, for example, for each user account may be stored within a user account database. In some embodiments, the accounts system 268 may store a voice signal, such as voice biometric information or fingerprint, for a specific user account. This may allow speaker identification techniques to be used to match a voice-to-voice biometric data associated with a specific user account. In some embodiments, the accounts system 268 may store a telephone number assigned to a particular user account, a device identifier associated with a particular device, a communications identifier associated with a particular user account and/or group account, or any other suitable information, or any combination thereof.

It should also be recognized that each of the ASR system 258, NLU system 260, subject matter/skills system 262, TTS system 264, and accounts system 268 may include instances of the processor(s) 252, storage/memory 254, and communications circuitry 256. These instances of processor(s) 252, storage/memory 254, and communications circuitry 256 within each of the ASR system 258, NLU system 260, functionalities system 262, TTS system 264, and accounts system 268 may differ. For example, the structure, functionality, and style of the processor(s) 252 within ASR system 258 may be substantially similar to the structure, functionality, and style of the processor(s) 252 within NLU system 260, however the actual processor(s) 252 need not be the same entity.

The computer system 200 may also include, in a non-limiting embodiment, a communications system 240, which may be configured to facilitate communications between the computer system 200, including an ordering system 220, language processing system 250, and two or more user devices 290 (illustrated as a first user device 290A and a second user device 290B). For example, the communications system 240 may be capable of facilitating a first communications session between a first user device 290A (e.g., voice controlled device 106) and the language processing system 250. Upon the language processing system 250 determining that an utterance indicates a user confirming that information of a payment instrument is needed for transaction, the communications system 240 may facilitate a second communications session between the second user device 290B and the communications system 240. For example, the communications system 240 may employ VoIP functionality to facilitate audio, video, and/or text data communications between the communications system 240 and the second user device 290B (e.g., mobile device 122).

As an illustrative example, a first communications session may be established between a first user device 290A and the communications system 240. In one example embodiment, an individual (e.g., a caller) may speak an utterance (e.g., "Alexa, purchase the t-shirt") to their user device 290A. The microphone 208 of the user device 290A may receive the audio and parse the utterance to detect whether a wakeword was included with audio. In response to detecting the device's wakeword (e.g., "Alexa"), the user device 290A may begin sending audio data representing the utterance to the computer system 200, and in particular to the language processing system 250. Upon receipt, the automatic speech recognition (ASR) system 258 may perform speech recognition processing, such as speech-to-text processing, to the audio data to generate text data representing the audio data.

The text data may then be passed to the natural language understanding (NLU) system 260 to determine the intent of the utterance. For example, the NLU system 260 may include a listing of sample utterances to be used to disambiguate the spoken words and determine an action intended to occur for the utterance. In some embodiments, a messaging speechlet system may be included within the NLU system 260 that includes one or more sample utterance frameworks. If the format of the spoken utterance substantially matches one of these sample utterances, then that may indicate that the intent of the utterance was for a purchase confirmation.

For example, one sample utterance may be "{Wakeword}, purchase {Item}" or, alternatively, the sample utterance may be "Yes" to confirm the prompt "Would you like to purchase {Item}?" If the framework of the text data for the spoken utterance substantially matches this sample utterance framework, the NLU system 260 may determine that the intent of the utterance was to initiate or confirm a purchase. After determining that a purchase should be initiated, the communications system 240 may interact with the order system 220 to confirm purchase details. In some examples, the availability to confirm the ordering from the VCD 290A may originate with a confirmation of the user to conduct a one click payment process. This confirmation may be stored with a user account profile.

The language processing system 250 may identify an item identifier associated with {Item} in the utterance received by the first user device 290A. The item may correspond with a physical item that may be physically shipped, non-digital products or services, subscriptions, or service available for ordering. The item identifier may be associated with an item description, electronic merchant that offers item, and a price. In some examples, the first user device 290A may execute a script that recites the item name and/or description and price via the speaker 210. The first user device 290A may request confirmation or canceling of the order associated with the recited item information.

Upon receiving a confirmation utterance by the user, the ordering system 220 may store the item identifier with a user profile of the user upon receiving the utterance to confirm a purchase of the item. In some examples, this may include adding the item identifier to an electronic shopping cart associated with these profile.

In order to add the item to user profile, the ordering system 220 may determine an identifier associated with the first user device 290A and access the user account associated with the identifier. The user account may identify whether information associated with an active payment instrument is stored with the user account. For example, the instrument engine 222 may access the user account to determine that a credit or debit account number, CVV, and expiration date are stored with the user account. The instrument engine 222 may confirm that the information of the payment instrument is available for initiating a purchase of the item associated with the item identifier. When the information of the payment instrument is unavailable, the instrument engine 222 may interact with the communications system 240 to initiate a communication with a second user device 290B to acquire the information of the payment instrument.

The communications system 240 may access the user account to determine a fourth identifier associated with a mobile device of the user. The fourth identifier may be received from the user as an identification of a mobile device accessible by the user. In some examples, the fourth identifier may comprise a mobile device number that may receive calls or electronic messages from a third-party.

The communications system 240 may initiate a second communications session with a second user device 290B. The second communications session may be routed to the second user device 290B to establish an active communication line between the computer system 200 and the second user device 290B. The second communications session may correspond with a telecommunications protocol or an electronic messaging protocol. The communications protocols may correspond with defined formats for exchanging various messages, including the nature of the communication, the actual data exchanged, and any state dependent behaviors that would be defined by the specifications.

The instrument engine 222 may determine the information of the payment instrument that is needed for the transaction. For example, when a credit or debit account number is missing from the user profile, the instrument engine 222 may determine that the account number is needed for the transaction, based at least in part on using the account number to charge the amount of the item in order to complete the transaction. For example, this may include deducting the amount of the item from the account associated with the account number and transferring the amount of the item to an account of the merchant. As such, the account number may be identified by the instrument engine 222 as missing information that is needed from the user in order to conduct the transaction.

The language processing system 250 may execute a text to speech (TTS) content that identifies the missing information that is needed from the user. In this example, the language processing system 250 may select a text to speech (TTS) template that requests the account number that is missing from the user account. As a sample illustration, the template may include "In order to complete your purchase of {Item}, please provide your {Missing Information}." The language processing system 250 may execute the script corresponding with the item identifier, the information of the payment instrument, and/or the user identifier in order to convert the text of the template to speech.

The communications system 240 may transmit the converted speech to the second user device 290B. The converted speech may be transmitted as an electronic file that is played at the second user device 290B, or in some examples, the converted speech may be transmitted and played by the communications system 240 so that the speech is played over a telecommunications protocol and received at the second user device 290B.

The second user device 290B may receive the TTS content that requests user input about the information of the payment instrument. Depending on the method of transmitting the converted speech content, the user may respond by providing user input. For example, when the TTS content is transmitted via a telecommunications protocol, the user may provide user input using a touchtone phone of the second user device 290B. As a sample illustration, when the account number is "123," the user input may correspond with selecting a first button at the user device corresponding with the number one, selecting a second button at the user device corresponding with the number two, and selecting a third button at the user device corresponding with the number three. Each of these selections may correspond with a unique and standardized audio tone of the number in a dual-tone multi-frequency signaling (DTMF) system. The selection of the buttons may correspond with a push-button telephone or similar telecommunication device to generate the frequency signaling of the numbers. In some examples, the buttons may be digitized and selected via a display associated with the device.

The communications system 240 may receive the audio tones corresponding with the user input about the information of the payment management from the second user device 290B. The language processing system 250 may convert the audio tones corresponding with the user input to numbers corresponding with the information of the payment instrument. The numbers may be stored as the missing information of the user account using the accounts module 268.

In some examples, the request for user input about the information of the payment instrument may be repeated for each missing information of the payment instrument. For example, the language processing system 250 may execute a text to speech (TTS) content that identifies first missing information (e.g., payment account, etc.) that is needed from the user and transmit the TTS content requesting the first user input to the second user device 290B. The language processing system 250 may also execute a second TTS content that identifies second missing information (e.g., expiration date of the payment account, etc.) that is needed from the user and transmit the second TTS content requesting the second user input to the second user device 290B. The first and second user input may be received from the user device and stored with the corresponding user account.

The instrument engine 222 may assess the information of the payment instrument associated with the user account to confirm whether the information is complete and available to initiate the transaction. When incomplete, the instrument engine 222 may repeat the request for information for the payment instrument. When complete, the instrument engine 222 may notify order engine 224 to restart the order process.

The order engine 224 may receive the complete information of the payment instrument and the item identifier stored with the user account. The transaction engine 228 may submit the information of the payment instrument and the item information through a standard transaction process. For example, the transaction may be initiated using Amazon Pay® or similar system and method.

The timing module 226 of the order system 220 may terminate the second communications session with the second user device 290B. For example, the timing module 226 may terminate the session upon determining that the complete information of the payment instrument has been received and/or the transaction process has been initiated for the item. The termination of the second communications session may be stored with the user account. In some examples, the corresponding first communications session may be identified with the user account by an identifier of the first communications session. The communications routing module 236 may initiate the first communications session associated with the first identifier of the first communications session with the first user device 290A upon termination of the second communications session with the second user device 290B.

In some embodiments, the communications system 240 may include a communication rules engine 242 that may store various rules for how certain communications between group accounts and user accounts are to behave and that may store device information for different user devices. For example, the communications rules engine 242 may store communications routing information and instructions for how different messages may be sent to the user devices depending on a variety of parameters including, but not limited to, if the first user device 290A is a shared device, if the second user device 290B is a shared device, if the first user device 290A is a personal device, if the second user device 290B is a personal device, if there are any personal and/or shared devices associated with the user devices, and/or whether or not speaker identification was able to positively identify a speaker. Other parameters relate to the device information, such as device type identifier, software version, and status. In some illustrative embodiments, the communication rules engine 242 may store a communications table indicating various device identifiers, group account identifiers, communication identifiers, and device types for various devices interacting with the communications system. In addition, the communication rules engine 242 may generate content, such as TTS audio, based on an identifier of the user device 290, where this content can identify a party initiating a communications session (e.g., the caller and/or the user device 290).

The computer system 200 may also include, in some embodiments, a speaker identification system 270 that may correspond to any suitable device/system capable of identifying a particular person's voice from an audio signal. The speaker identification system 270 may determine whether a current voice being used to speak matches known voice biometric data associated with a particular individual's voice. In some embodiments, voice biometric data may be stored within the accounts system 268 for various individuals having a user account stored thereby. For example, the caller may have a user account on the computer system 200 (e.g., stored within the accounts system 268), which may be associated with the initiating device 210. Stored within that user account may be voice biometric data associated with a voice profile for the caller. Therefore, when an utterance is detected, and subsequently when audio data representing that utterance is received by the computer system 200, the speaker identification system 270 may determine whether the voice that spoke utterance matches, to at least a predefined confidence level, the stored voice biometric information associated with the caller stored by their user account. If so, then this may indicate that the caller is the likely speaker of the utterance.

The communications rules engine 242 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system 270 as to whether or not a speaker that spoke the utterance was identified. Using these two parameters, for instance, the communications rules engine 242 may be configured to cause the communications system 240 to facilitate communications between two or more devices.

Figure 3:
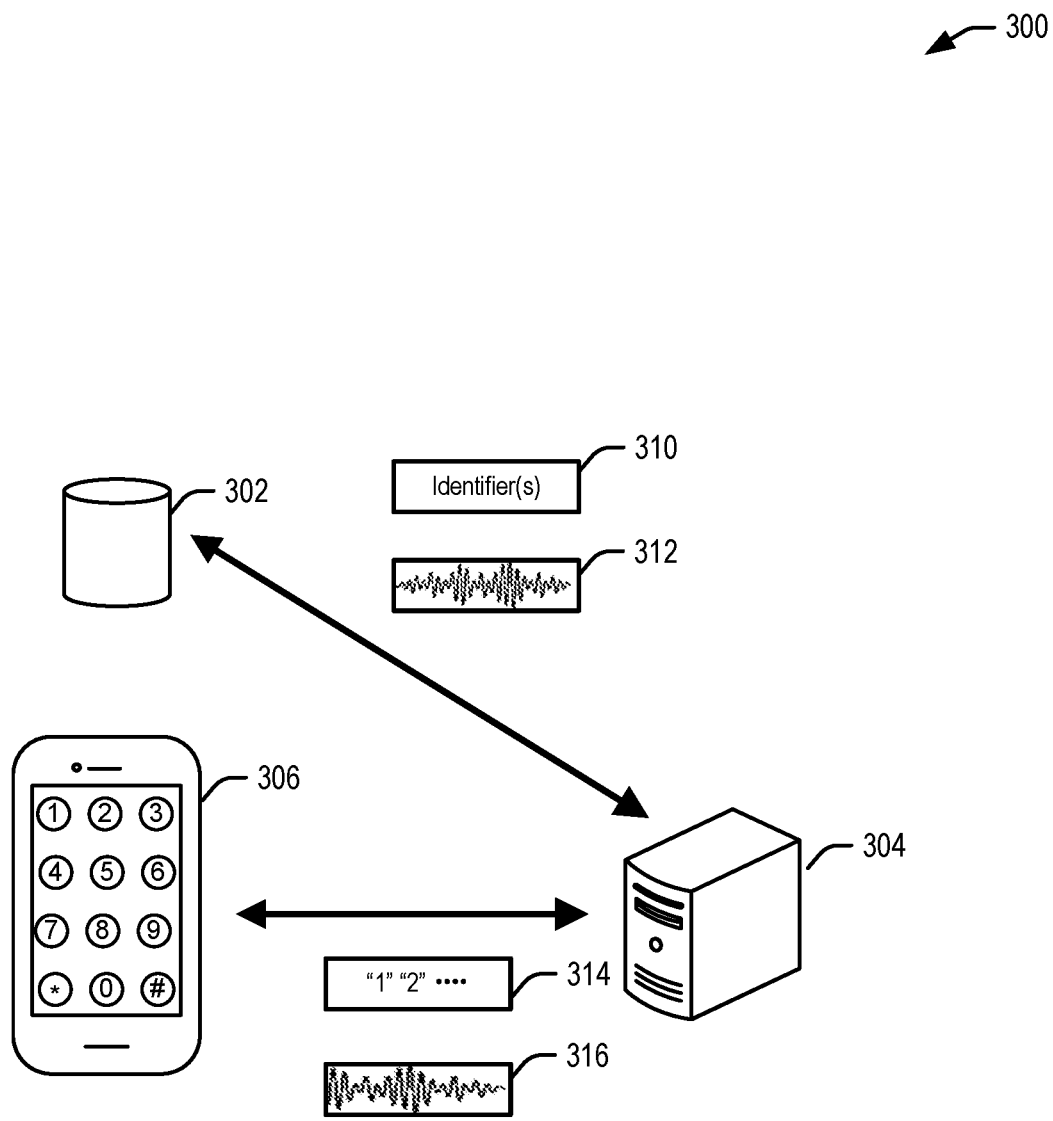
FIG. 3 illustrates communications between a computer system and devices via a plurality of communications sessions, according to at least one example.

FIG. 3 illustrates communications between a computer system and devices via a plurality of communications sessions, according to at least one example. In illustration 300, the voice controlled device (VCD) 302 may communicate with the computer system 304 and the computer system may communicate with the mobile device 306. The voice control device 302 and the mobile device 306 may be in possession and/or accessible by a user.

The VCD 302 may provide one or more identifiers 310 from the VCD 302 to the computer system 304. The one or more identifiers 310 may be provided as electronic messages to identify information associated with the VCD 302. This may include, for example, a first identifier of one or more communications sessions between the VCD 302 and the computer system 304. The one or more identifiers 310 may also include an identifier of a user associated with the VCD 302 (e.g., user account identifier, individual user identifier, etc.). In some examples, the one or more identifiers 310 may also include an identifier associated with a transaction initiated by the VCD 302 associated with an order for an item associated with a payment instrument of the user.

The VCD 302 may provide audio data 312 from the VCD 302 to the computer system 304. The audio data 312 may be received via one or more microphones associated with the VCD 302. The audio data 312 may be transmitted via a network to the computer system 304 for language processing, conversion from speech to text, or other processing described herein.

The mobile device 306 may provide user input 314 from the mobile device 306 to the computer system 304. The user input 314 may correspond with unique and standardized audio tones of numbers of the mobile device 306 that are selected and transmitted sequentially to the computer system 304.

In some examples, second audio data 316 may be generated by the computer system 304 and transmitted via the second communications session to the VCD 302. The audio data 316 may comprise instructions (e.g., TTS content, etc.) that request a user to provide the user input 314 at the mobile device 306. As a sample illustration, the second audio data 316 may include, for example, "please provide your account information. This request is related to your current interactions with your voice controlled device."

Figure 4:
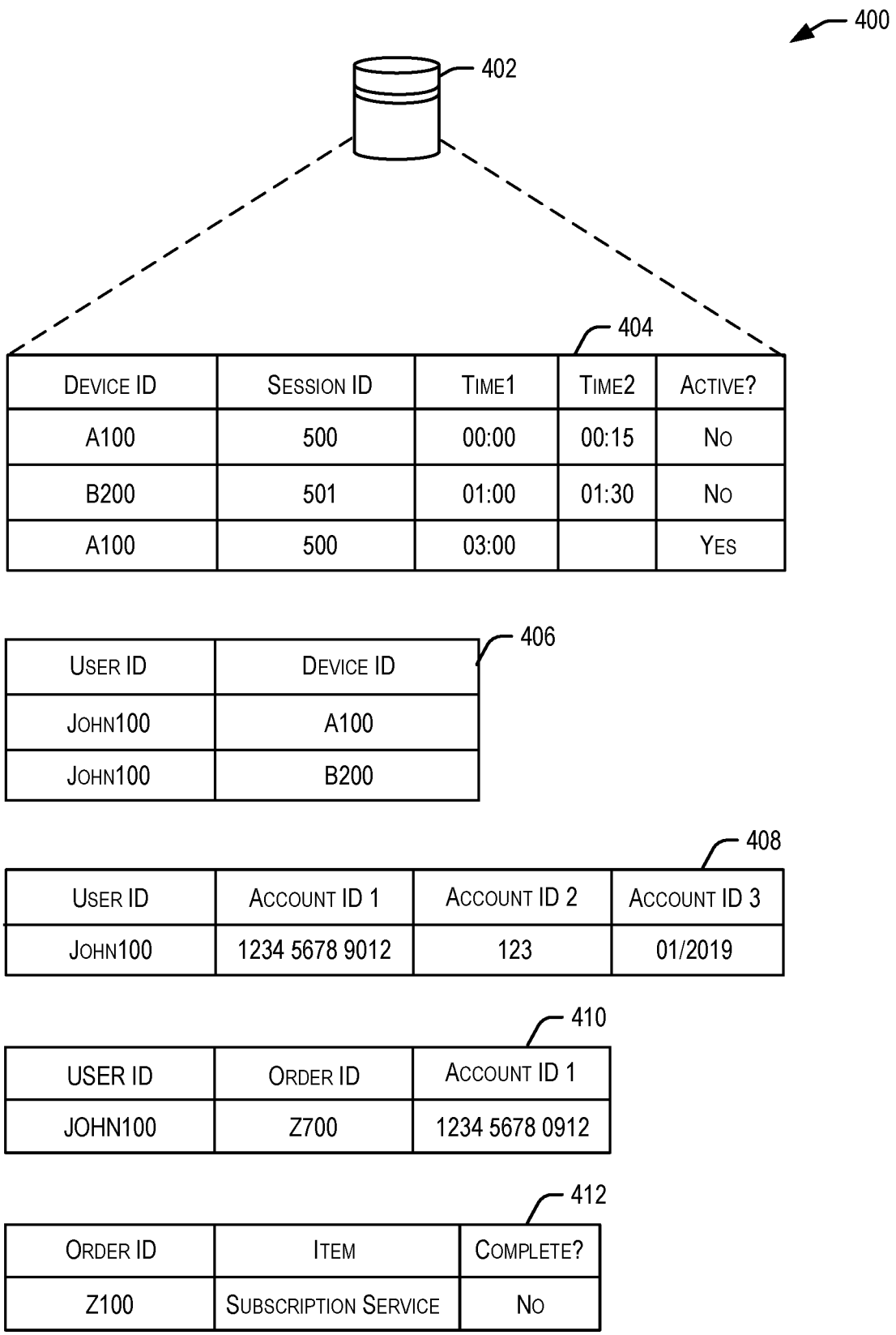
FIG. 4 illustrates an example data store, according to at least one example.

FIG. 4 illustrates an example data store, according to at least one example. In illustration 400, the data store 402 may comprise various information associated with the communications between one or more user devices and the computer system illustrated throughout the application, including the user devices 290 and the computer system 200 at FIG. 2. Data in these and other tables of the data store 402 may be persisted for future transactions as well.

The data store 402 may comprise communications session information 404. For example, the communications session information may include one or more device identifiers associated with a communications session, a communications session identifier, a start time associated with the communications session, an end time associated with the communications session, and one or more flags that identify whether the communications session is active between the user device and the computer system.

In some examples, the communications session may correspond with a timeout threshold. For example, the communications session may be active as long as audio data is received in association with the communications session. When audio data is no longer received, a timeout threshold (e.g., five seconds, eight seconds, twelve seconds, etc.) may be applied to the communications session at the user device. When audio data is not received within the timeout threshold, the communications session may be deactivated so that audio data is not received after the deactivation until a wakeword is received at the user device to initiate another communications session.

In some examples, a deactivated communications session may be reactivated upon termination of another communications session. For example, a timing of a first communications session may exceed the timeout threshold and be deactivated. The session identifier associated with the deactivated session may be reestablished upon instruction from the computer system (e.g., upon termination of another communications session and restarting of the original communications session, etc.).

The data store 402 may also comprise one or more device identifiers 406 associated with devices of the user. For example, a user may be associated with a voice control device (VCD) and a mobile device. Each of these devices may correspond with a unique identifier and correlated to an identifier of the user in the data store 402.

In some examples, the one or more device identifiers 406 may correspond with a confirmation received from the user to communicate with the device. The confirmation may be received from a second device associated with the user identifier and may be stored with the user account of the data store 402 for the user. The confirmation of the user to communicate with the device may be stored with additional identifiers as well, including the identifier associated with user and/or the identifier associated with the confirmed device.

The data store 402 may also comprise information associated with one or more payment instruments 408 needed for a transaction. The information may comprise, for example, a first account identifier (e.g., a credit or debit primary account number), a second account identifier (e.g., a CVV), and a third account identifier (e.g., an expiration date). In some examples, one or more identifiers associated with the information of the payment instrument may be missing, expired, or incomplete and the computer system may receive and update/store information for the individual identifiers without affecting the other identifiers.

The data store 402 may also comprise order information 410. The order information 410 may associate a user identifier with an order identifier and one or more account identifiers that can be used to complete the transaction associated with the order identifier. In some examples, the order may be submitted as a transaction and funds associated with the account identifier may be transferred from the account identifier of the user to an account identifier of a merchant that offers an item identified with the order identifier.

The data store 402 may also comprise an order history 412. The order history 412 may comprise information associated with a complete or incomplete order of a user. For example, in order identifier associated with the user may correspond with a particular item, service, or subscription. The order may be complete when a payment instrument is associated with the order and/or submitted to initiate a transaction for the order. The order may be incomplete when information associated with the payment instrument is missing, expired, or incomplete. The order information may be stored with the data store 402 and identified as complete or incomplete until the order has been submitted with the transaction.

Figure 5:
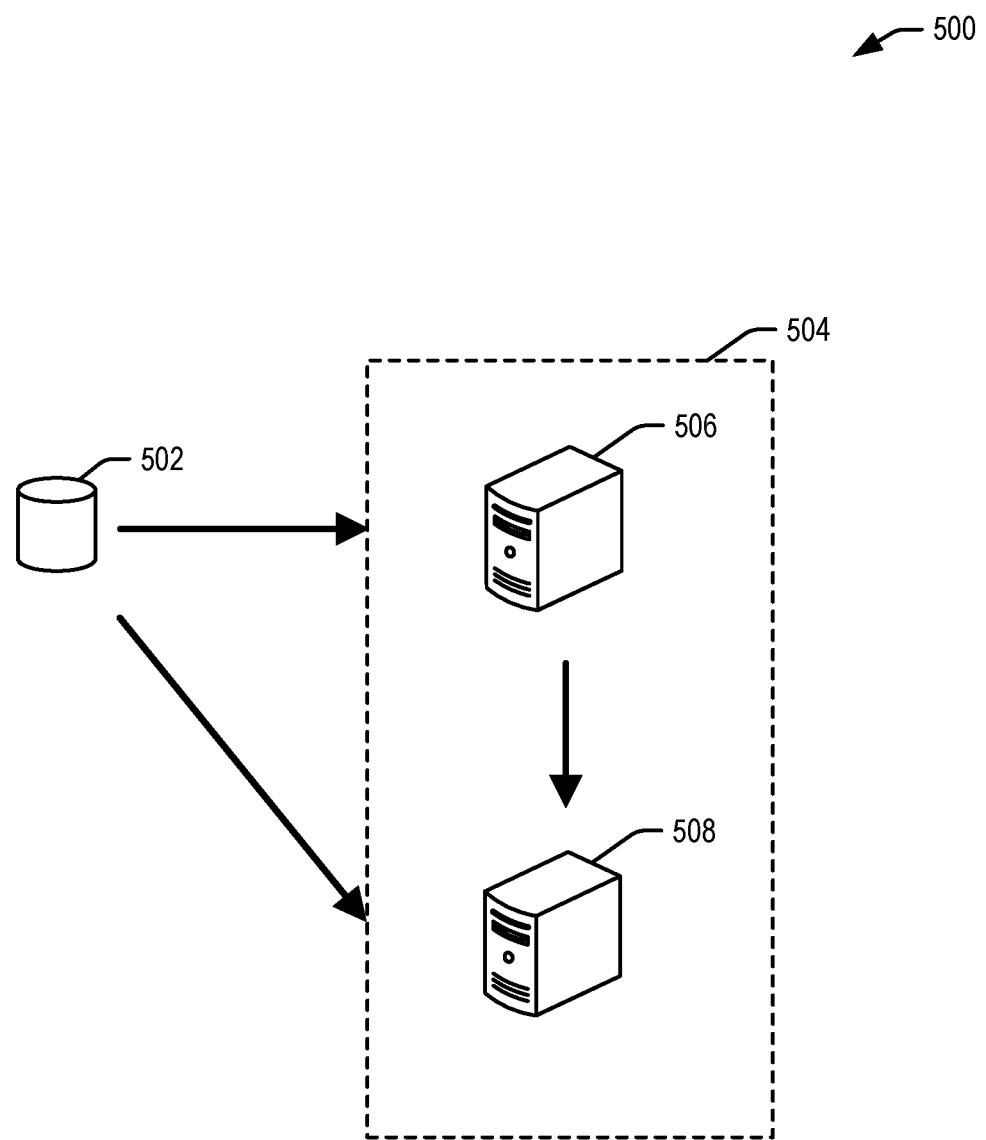
FIG. 5 illustrates a voice controlled device (VCD) in communication with a computer system, including a language processing system and an order system, according to at least one example.

FIG. 5 illustrates a voice controlled device (VCD) in communication with a computer system, including a language processing system and an order system, according to at least one example. In illustration 500, the VCD 502 may communicate with the computer system 504 that comprises a language processing system 506 and an ordering system 508. The features of these devices may be similar to the devices described with FIG. 2, include the user device 290A, computer system 200, language processing system 250, and order system 220, respectively.

The ordering system 508 may be a component of the computer system 504 or may be implemented as a separate system, including a digital wallet or electronic marketplace that is in communication with the computer system 504. The ordering system 508 a comprise one or more merchant user accounts that provide one or more items, subscriptions, or services for ordering by a one or more users via one or more VCDs 502. Other devices may access in order these items from the ordering system 508 without diverting from the essence of the disclosure.

In some examples, the language processing system 506 and/or the ordering system 508 may request a confirmation from the user to store user input data for future use. In some examples, the user data (e.g., payment information, etc.) may be persisted with a digital wallet or electronic marketplace for future transactions.

Figure 6:
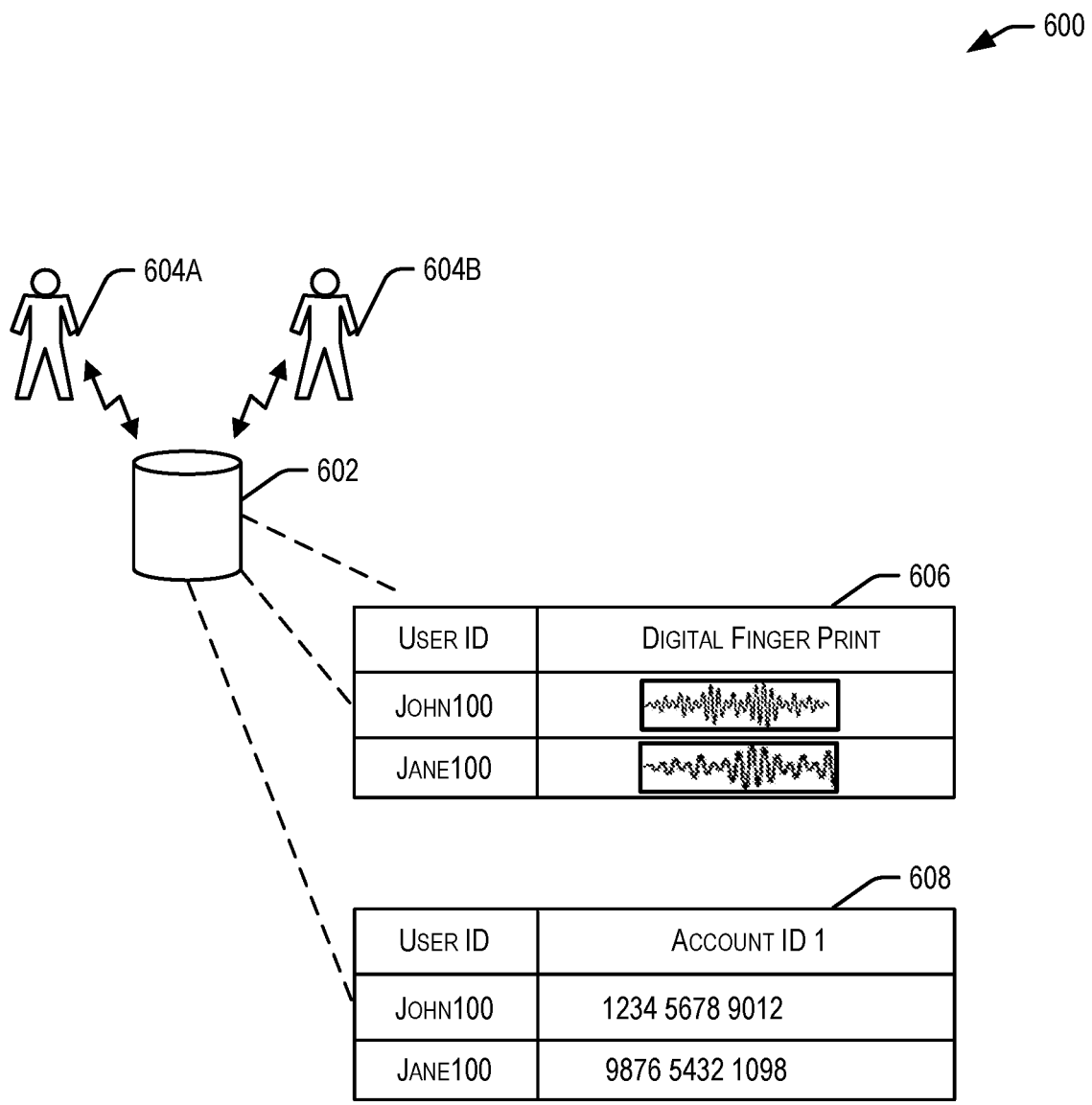
FIG. 6 illustrates a voice controlled device (VCD) with multiple user accounts, according to at least one example.

FIG. 6 illustrates a voice controlled device (VCD) with multiple user accounts, according to at least one example. In illustration 600, a plurality of users 604 may interact with a single VCD 602. In some examples, the users may each correspond with a sound profile 606 corresponding with a frequency and temporal decomposition of a particular audio portion from the users 604 and/or a payment instrument 608.

As a sample illustration, a first user 604A may provide an utterance to the VCD 602. The VCD 602 may analyze the utterance by comparing its HMM model to an HMM model of the trigger expression, yielding a feature score that represents the similarity of the audio signal model to the trigger expression model. When the comparison between the audio file associated with the utterance and the sound profile for various users identifies an association with one of the sound profiles, the corresponding identifier of the user may be associated with the utterance. In addition to identifying the sound profile of the user, the user identifier may be matched to an account identifier of a payment instrument 608. Any confirmation of transactions associated with the utterance from the VCD 602 may be associated with the payment instrument corresponding with the identified sound profile of the user.

The computer system may determine a voice fingerprint associated with the user as well as an audio fingerprint of the audio segment, as described herein. Prior to initiating the transaction, the computer system may compare the voice fingerprint with the audio fingerprint. A match between the two audio sources may identify a corresponding user account profile associated with the audio fingerprint data.

Figure 7:
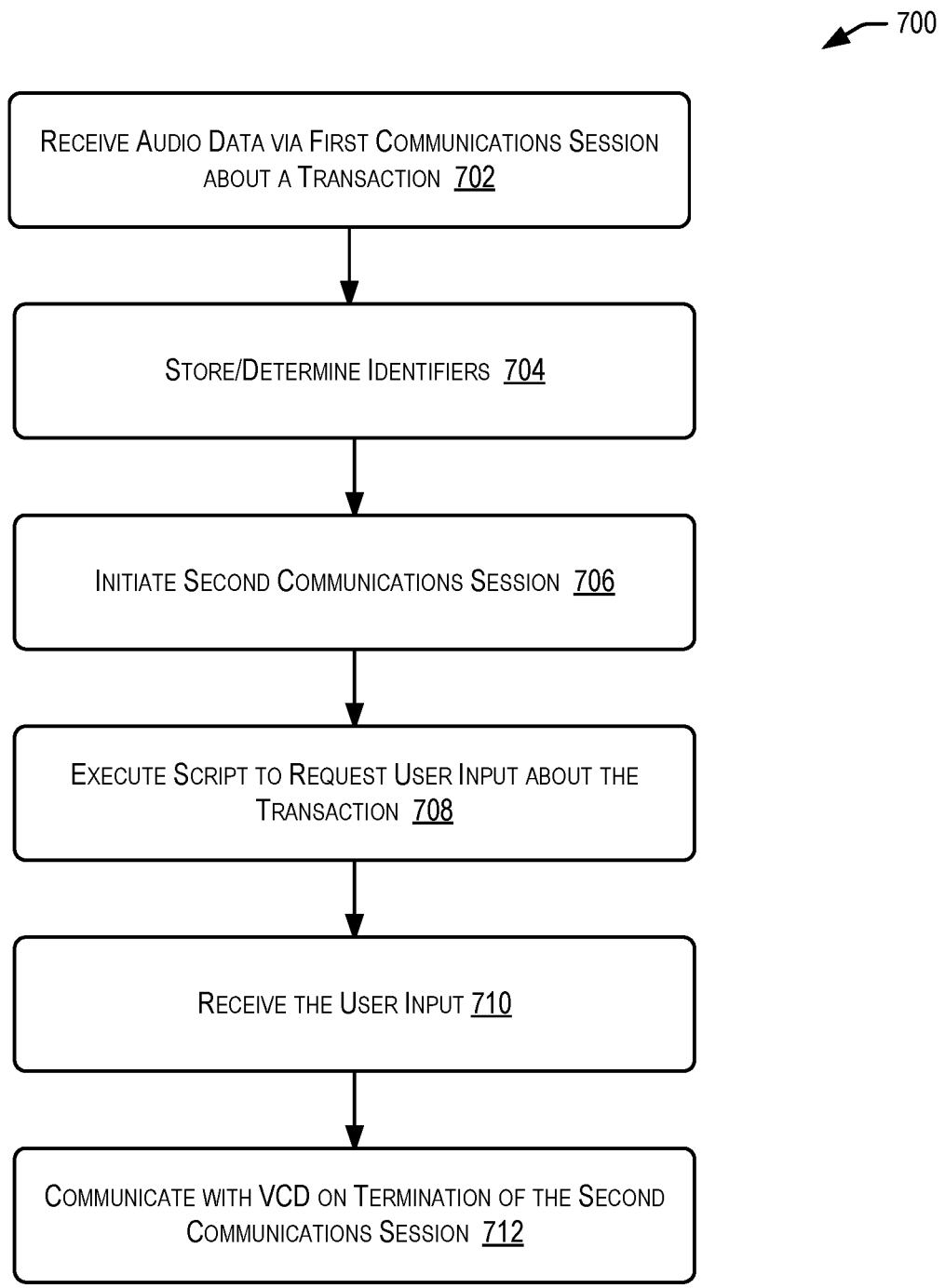
FIG. 7 illustrates an example flow diagram for providing a language processing system described herein, according to at least one example.

FIG. 7 illustrates an example flow diagram for providing a language processing system described herein, according to at least one example. In some examples, the one or more computer systems 200 or one or more user devices 290 shown in FIG. 2 may perform the process 700 of FIG. 7.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at 702 by receiving audio data via a first communications session about a transaction. For example, a computer system 200 may receive audio data from a VCD 290A. The computer system 200 may analyze the audio data to identify one or more utterances of the user included with the audio data. In some examples, the audio data may indicate an utterance of a user confirming that information of a payment instrument is needed for transaction.

At 704, identifiers may be determined and/or stored. For example, the computer system 200 may determine one or more identifiers associated with the communications session with the VCD 290A. The identifiers may include, for example, a first identifier of the first communications session, a second identifier of the user, and/or a third identifier of the transaction. In some examples, the computer system may determine a fourth identifier of a mobile device 290B of the user by accessing a user account associated with the second identifier of the user. The user account may store the fourth identifier of the user.

At 706, a second communications session may be initiated. For example, the computer system 200 may initiate the second communications session with the mobile device based at least in part on the fourth identifier of the mobile device 290B. In some examples, the first communications session with the VCD 290A may be a different communications protocol than the second communications session with the mobile device 290B.

At 708, a script may be executed to request user input about the transaction. For example, the computer system 200 may execute the script that synthesizes text to speech (TTS) content based at least in part on one or more identifiers associated with the first communications session, including the second identifier of the user and the third identifier of the transaction. The TTS content may request user input about the information of the payment instrument of the transaction. The TTS content may be transmitted to the mobile device associated with the fourth identifier for presentation at the mobile device 290B.

At 710, user input may be received. For example, the computer system 200 may receive user input via the second communications session. The user input may comprise information of the payment instrument. The computer system 200 may store the information in a user account associated with the user identifier.

At 712, communications may be started with the user. For example, the computer system 200 may identify that the second communications session with the mobile device 290B has been terminated. Upon identification of the termination of the second communications session, the first communications session corresponding with the first identifier of the first communications session may be restarted between the VCD 290A and the computer system 200. In some examples, upon identification of the termination of the second communications session, a new third communications session may be started between the VCD 290A and the computer system 200.

Illustrative methods and systems for establishing and restarting communications sessions are described above. Some or all of these systems and methods may, but need not, be implemented at least partially by architectures such as those shown at least in FIGS. 1-7 above.

Figure 8:
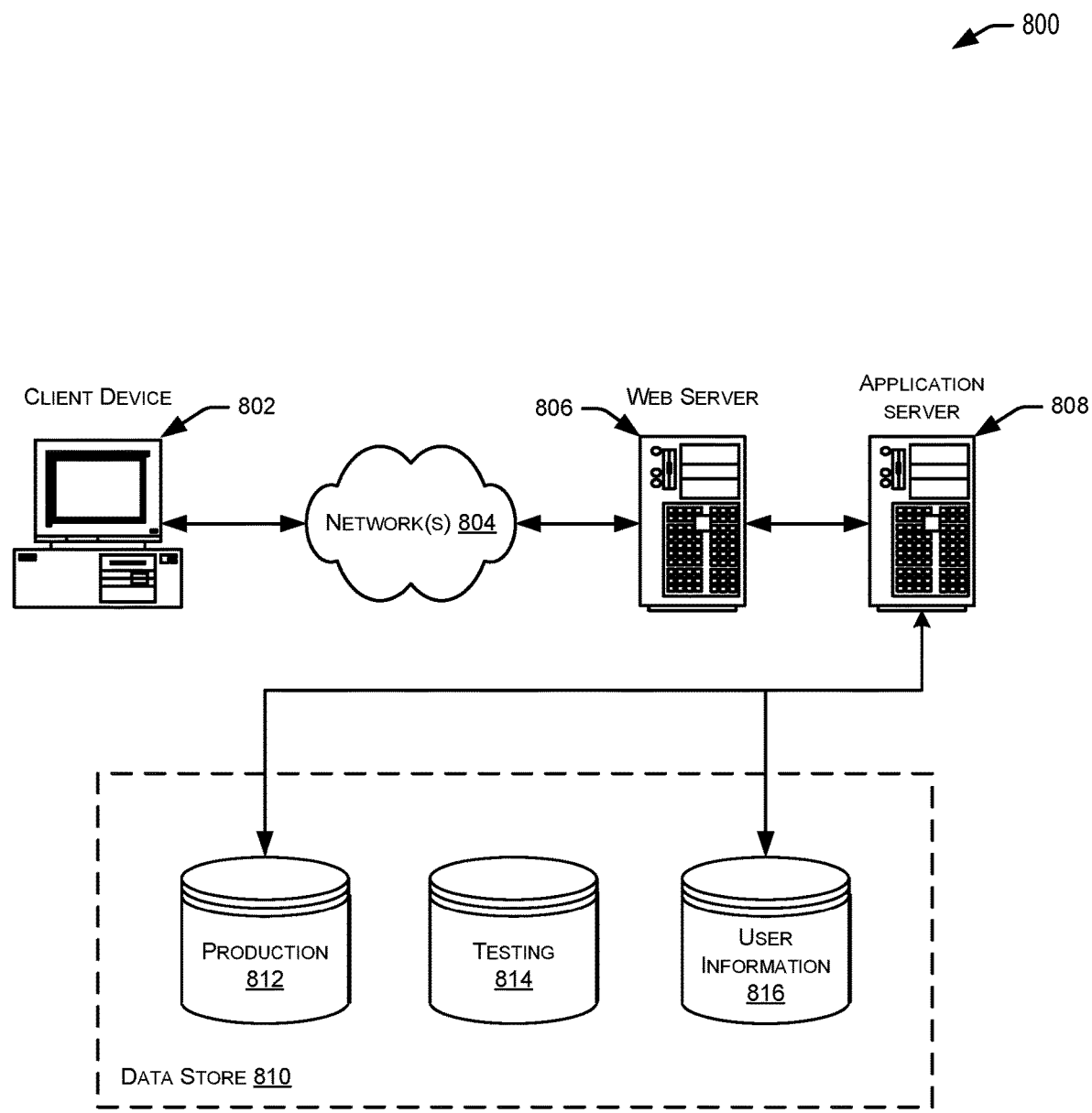
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more computer-readable storage media collectively storing computer-executable instructions that, when executed by one or more computer systems that include a natural language processing system and a communications system, configure the one or more computer systems to collectively perform operations comprising:
receiving, in a first communications session with a voice-controlled device (VCD), audio data from the VCD, the audio data indicating an utterance of a user confirming that information of a payment instrument is needed for a transaction;

storing, based at least in part on the audio data from the VCD, a first identifier of the first communications session, a second identifier of the user, and a third identifier of the transaction;

determining, from a user account of the user, a fourth identifier of a mobile device of the user based at least in part on the second identifier of the user;

initiating a second communications session with the mobile device based at least in part on the fourth identifier of the mobile device;

based at least in part on the second identifier of the user and the third identifier of the transaction, executing a script that synthesizes text-to-speech (TTS) content, the TTS content requesting user input about the information of the payment instrument;

transmitting, in the second communications session, the TTS content to the mobile device for presentation at the mobile device;

receiving, in the second communications session, the user input about the information of the payment instrument from the mobile device, the user input comprising the information of the payment instrument;

storing the information in the user account; and restarting the first communications session based at least in part on the first identifier of the first communications session and on a termination of the second communications session.

2. The one or more computer-readable storage media of claim 1, further comprising:

receiving, in the second communications session, a confirmation of the user to communicate over the VCD, wherein the first communications session is restarted in response to the confirmation.

3. The one or more computer-readable storage media of claim 1, further comprising:

generating second text-to-speech (TTS) content to continue to communicate with the user over the VCD or the mobile device; and transmitting the second TTS content to the mobile device for presentation at the mobile device.

4. The one or more computer-readable storage media of claim 1, further comprising:

prior to the first communications session being established, receiving a confirmation of the user to communicate over the VCD; and storing the confirmation with the user account associated with the second identifier of the user or the fourth identifier of the mobile device, wherein the first communications session is restarted based at least in part on the confirmation of the user to communication over the VCD.

5. A computer-implemented method, comprising:

receiving, in a first communications session with a voice-controlled device (VCD), data from the VCD, the data corresponding to audio data originating from a user and being associated with a transaction, and the first communications session being associated with a first identifier of the first communications session, a second identifier of the user, and a third identifier of the transaction;

determining a fourth identifier of a device of the user based at least in part on the transaction, the device associated with the second identifier of the user and different from the VCD;

initiating a second communications session with the device based at least in part on the fourth identifier of the device;

based at least in part on the second identifier of the user and the third identifier of the transaction, executing a script that synthesizes text-to-speech (TTS) content, the TTS content requesting user input about the transaction;

transmitting, in the second communications session, the TTS content to the device for presentation at the device;

receiving, in the second communications session, the user input about the transaction from the device; and instructing the VCD to communicate with the user based at least in part on a termination of the second communications session.

6. The computer-implemented method of claim 5, wherein the VCD communicates with the user upon termination of the second communications session via the first communications session, wherein the first communications session is restarted based at least in part on the first identifier of the first communications session.

7. The computer-implemented method of claim 5, wherein the VCD communicates with the user upon termination of the second communications session via a third communications session, wherein the third communications session is different than the first communications session.

8. The computer-implemented method of claim 5, wherein the fourth identifier is determined from a user account based at least in part on the second identifier of the user and the method further comprises:

storing information about a payment instrument in the user account, the information included in the user input.

9. The computer-implemented method of claim 5, wherein the TTS content identifies the transaction.

10. The computer-implemented method of claim 5, wherein the TTS content identifies interactions with the VCD.

11. The computer-implemented method of claim 5, wherein the first communications session is paused prior to restarting the first communications session after the termination of the second communications session.

12. The computer-implemented method of claim 5, wherein the first communications session is terminated prior to restarting the first communications session after the termination of the second communications session.

13. The computer-implemented method of claim 5, wherein the TTS content requesting the user input about the transaction comprises requesting information about the device involved with the transaction.

14. A voice-controlled device (VCD) comprising:

a memory configured to store computer-executable instructions; and a processor in communication with the memory configured to execute the computer-executable instructions to at least:

receive, during a first communications session with a computer system, a user utterance of a user about a transaction;

send, in the first communications session, data to the computer system, the data representing the user utterance and causing the computer system to initiate a second communications session with a mobile device of the user, request user input about the transaction, and receive the user input;

receive instructions from the computer system to communicate with the user, the instructions received based at least in part on a termination of the second communications session; and communicate with the user based at least in part on the instructions.

15. The VCD of claim 14, wherein the computer-executable instructions are further configured to:

transmit, in the first communications session, a first identifier of the first communications session, a second identifier of the user, and a third identifier of the transaction.

16. The VCD of claim 15, wherein the computer-executable instructions are further configured to:

initiate the transaction based at least in part on the third identifier of the transaction and the user input.

17. The VCD of claim 14, wherein the user input includes payment information that is selected via a display associated with the mobile device.

18. The VCD of claim 14, wherein the user input updates expired information prior to initiating the transaction.

19. The VCD of claim 14, wherein the first communications session is paused prior to a predetermined timeout range.

20. The VCD of claim 14, wherein the data comprises an audio segment, and wherein the computer-executable instructions are further configured to:

determine a voice fingerprint associated with the user;
determine an audio fingerprint of the audio segment; and
prior to initiating the transaction, compare the voice fingerprint with the audio fingerprint.

* * * * *